(12) United States Patent
Mehr et al.

(10) Patent No.: US 6,438,547 B1
(45) Date of Patent: *Aug. 20, 2002

(54) COMPUTER-READABLE DATA PRODUCT FOR MANAGING SALES INFORMATION

(75) Inventors: Dale Arthur Mehr, Mankato; Jerome Dale Johnson, North Mankato, both of MN (US)

(73) Assignee: Firepond, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/567,492

(22) Filed: May 8, 2000

Related U.S. Application Data

(63) Continuation of application No. 08/926,870, filed on Sep. 10, 1997, now Pat. No. 6,141,658.

(51) Int. Cl.⁷ .......................... G06F 17/30; G06F 9/00
(52) U.S. Cl. ........................................................ 707/7
(58) Field of Search ...................................... 707/1–205

(56) References Cited

U.S. PATENT DOCUMENTS

| | | | |
|---|---|---|---|
| 5,237,498 A | 8/1993 | Tenma et al. | 705/3 |
| 5,765,143 A | 6/1998 | Sheldon et al. | 705/28 |
| 5,822,735 A | 10/1998 | De Lapa et al. | 705/14 |

*Primary Examiner*—Maria N. Von Buhr
(74) *Attorney, Agent, or Firm*—Merchant & Gould PC

(57) ABSTRACT

A computer system and method are used for managing product knowledge related to products offered for sale by a selling entity. The computer system includes a memory arrangement. At least one processing unit is coupled to the memory arrangement. A data model is defined that describes relationships between data categories. A data instance is input that corresponds to one or more of the data categories. The data instance represents at least part of the product knowledge. The computer system can also create a user-defined relationship item for the data instance and present the product knowledge to a user of the system in a manner established by the data model and the user-defined relationship. The product knowledge that is presented includes information that corresponds to the data instance.

17 Claims, 18 Drawing Sheets

COMPUTER-READABLE DATA PRODUCT FOR MANAGING SALES INFORMATION

This application is a Continuation of application Ser. No. 08/926,870, filed Sep. 10, 1997, now issued as U.S. Pat. No. 6,141,658, which application are incorporated herein by reference.

FIELD OF THE INVENTION

The present invention relates to computerized sales systems. More particularly, the present invention relates to computer systems and methods for managing knowledge related to sales.

BACKGROUND OF THE INVENTION

In recent years, corporations have made increasing use of computer systems to manage information related to products. For example, corporations that manufacture and sell products use a variety of types of data to manufacture, market, and sell their products. Some types of data used in connection with these processes include, e.g., graphics, technical specifications, pricing information, marketing brochures, financing plans, blueprints, technical schematics, compatibility rules, option lists, competitive information, and sales programs. This product information can be stored, for example, using a computer-accessible database and retrieved using a search engine. The capabilities of modern computer systems have enabled corporations to store vast amounts of product information in a system.

Typically, product information is generated and used by a variety of departments of divisions within a corporation rather than by a single entity. This decentralization of data management has created a number of challenges. For example, different departments within a corporation sometimes create redundant or nearly redundant data, resulting in unnecessary use of data storage resources. In addition, the use of redundant data by different departments typically involves global updating of the data when, for example, product specifications change. Failure to update all instances of a particular item of information can have adverse consequences, such as inconsistencies in the information used by the departments. For example, an engineering department might use the most current version of an information item, while a marketing department, unaware of changes in technical specifications, might use an outdated version of the same item.

As the size and complexity of a computer database increase, product information becomes more vulnerable to such inconsistencies. Inconsistency of data can result from a number of other sources. For example, a particular product description can be spelled out verbatim by one department, but abbreviated by another. This inconsistency in documentation between departments can cause the corporate identity of this information to be lost or confused.

The distributed nature of many corporate databases has resulted in a number of additional difficulties. For example, it is often difficult to manage relationships between data items used by different departments. As a result, many corporate database fail to take full advantage of available computing resources to manage product information effectively. This inefficient use of computing resources leads to increased data maintenance costs in many cases.

In order to address the problems associated with distributed corporate databases, some techniques, known as data warehousing, integrate enterprise information into a centralized database known as data warehouse. In data warehousing techniques, information from one source or asset can be reused for multiple purposes of applications. The data warehouse can store a variety of types of information, including, for example, alphanumeric data such as pricing, descriptions, specifications, marketing content, competitive data, performance values, finance factors, and weights. In addition, the data warehouse can also store business rules, e.g., processes, administration directions, workflow guides, and factors, as well as media information, such as product graphics, computer-aided design (CAD) designs, and video and audio files. Documents, such as bulletins, letters, manuals, proposals, and spreadsheets can also be stored in the data warehouse. It should be understood that the data warehouse can store data and information of different types from those described above.

Exporting processes are typically used to define and control the manner in which information is reused. Conventional processes of this type typically involve specifying the types of information that are desired for a particular purpose or application through the structure of the data warehouse. The information of the specific types is then extracted and provided to a client. Exporting processes typically do not allow the user to define the purposes for which an individual instance of information can be used or to specify applications to which the instance of information is available. For example, of a data type defined as Price, two instances can be defined as Retail and Cost and can be used to support two different systems. In one system, designed for customers, it might be desirable to grant access to the Retail instance only. By contrast, in the other system, designed for salespersons, access should be granted to both the Retail and Cost instances. Many traditional exporting processes fail to provide sufficient flexibility to define differential access rights to these instances.

Some data management tools provide structures for distributed users to enter information into corporate databases. Many such tools, however, only support a small variety of structures and are inadequately adapted to handle varying data models. In addition, while data management tools allow users to define relationships between information, many tools of this type fail to adequately use these relationships within themselves. Consequently, many users find it difficult to organize or view their information based on these relationships. In addition, many data management tools provide system administrators with relatively few options for defining users' access rights to information. For example, some such tools only allow system administrators to define access rights to broad categories of information. The lack of flexibility of many of these tools limits the usefulness of such tools in many applications environments. The usefulness of many data management tools is often also limited by the complicated user interfaces, such as scripts, involved in defining data relationships. Using such complicated interfaces increases the technical skill required to work with databases in many cases.

SUMMARY OF THE INVENTION

According to one embodiment, of the present invention is directed to a computer system for managing product knowledge related to products offered for sale by a selling entity. The computer system includes a memory arrangement. At least one processing unit is coupled to the memory arrangement. The computer system also includes means for defining a data model that describes relationships between data categories. A data instance can be input that corresponds to one or more of the data categories. The data instance represents at least part of the product knowledge. The computer system also includes means for creating a user-defined relationship item for the data instance and means for presenting the product knowledge to a user of the system in a manner established by the data model and the user-defined relationship. The product knowledge that is presented includes information corresponding to the data instance.

According to another embodiment of the present invention, a computer system implemented method is used in managing product knowledge. The product knowledge comprises data items related to products offered for sale by a selling entity. The computer system includes a memory arrangement and at least one processing unit. The method comprises defining a data model of data categories. The data model establishing relationships between data categories. A particular data item is received in the computer system that corresponds to one or more of the data categories. User-defined relationship information is received for the particular data item. The relationship information relates the particular data item to one or more other data items. The product knowledge, which includes information about the particular data item, is present to a user of the system. The manner in which the product knowledge is presented is established by the data model and the user-defined relationship.

The above summary of the invention is not intended to describe each disclosed embodiment of the present invention. This is the purpose of the figures and of the detailed description that follows.

BRIEF DESCRIPTION OF THE DRAWINGS

Other aspects and advantages of the present invention will become apparent upon reading the following detailed description and upon reference to the drawings in which.

Figure 1:
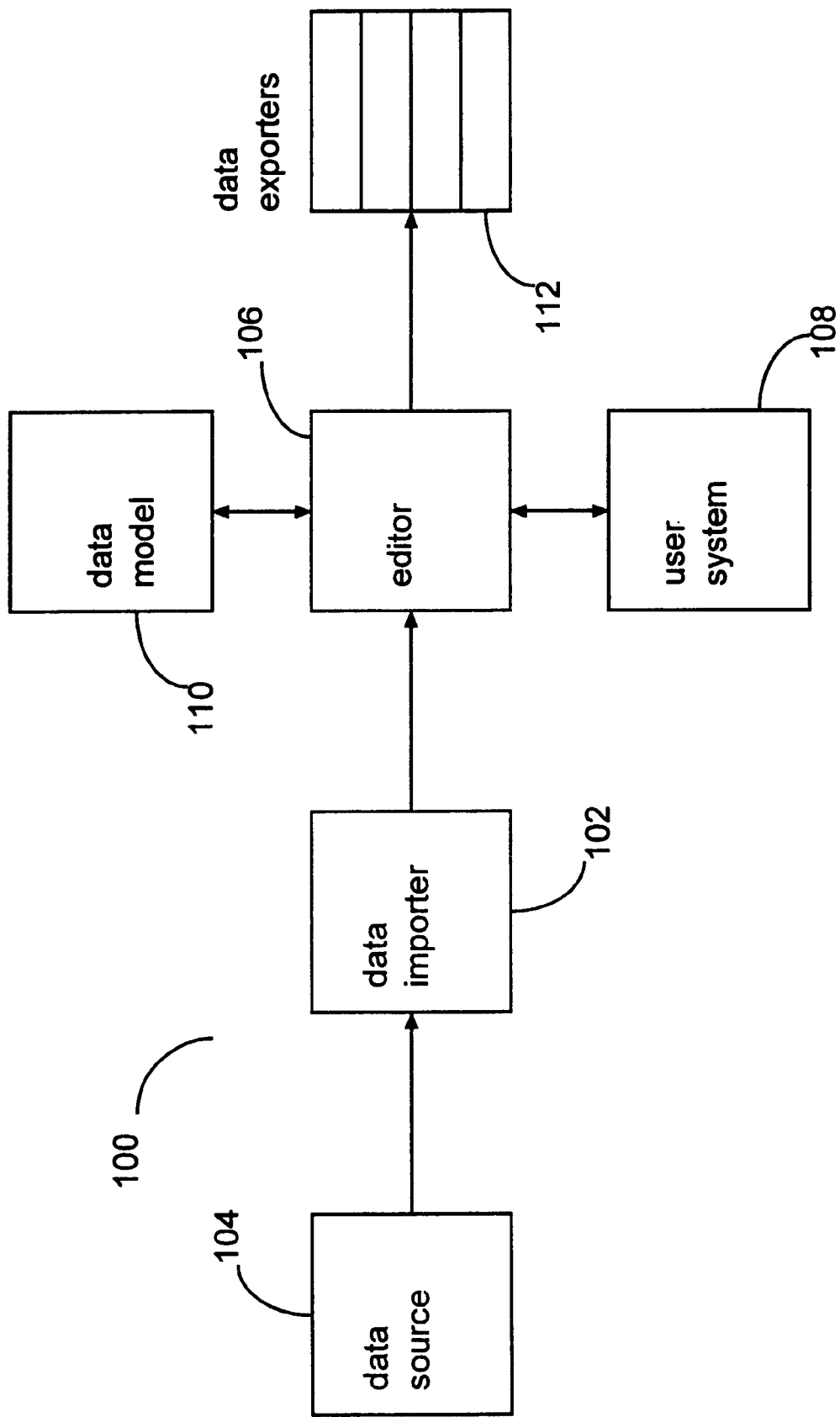
FIG. 1 is a block diagram illustrating an example system for managing enterprise information, according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS EMBODIMENTS

The present invention is believed to be applicable to a variety of systems and arrangements that manage sales information. The invention has been found to be particularly advantageous in environments characterized by distributed computing resources, such as many corporations that have several departments. An appreciation of various aspects of the invention is best gained through a discussion of various application examples operating in such environments.

According to the present invention, an integrated, powerful, and user-friendly knowledge management tool is provided for managing data stored in a data warehouse in a relational manner with a focus on customer solutions. Using this tool, users of a data warehouse can control access rights of various information producers and consumers in the system and can distribute content and control of individual instances of the information to other users. Moreover, the data in the data warehouse can be shared with a variety of other products and consumers of information, such as legacy systems or Internet sites. Distribution and management rights to the data can also be controlled on a detailed level.

Users can also define and understand relationships between information in the data warehouse. For example, users can define hierarchical relationships between information, behaviors associated with particular types of information, and rules governing the information. A data modeler creates and uses a data-driven data model to organize the items of information and the relationships between them as data objects. This type of data model allows the relationships between the information to be used to govern navigation in a graphic user interface (GUI) and the display and organization of information in the data warehouse. Some elements of the GUI are used to facilitate the definition of relationships between information. With a user-friendly GUI, the level of technical skill required to define relationships between information is reduced.

FIG. 1 is a block diagram illustrating an example system 100 for managing enterprise information according to an embodiment of the present invention. The system 100 includes a data importer 102 that receives information from a data source 104. The data source 104 can be, for example, a legacy system. It should be understood that, while FIG. 1 illustrates a single data source 104, the system 100 can include a plurality of data sources 104. The data importer 102 converts the information from the data source 104 into a format compatible with the data warehouse.

An editor 106 is used for interactively editing data for insertion into the data warehouse. A user can employ a user system 108 to control the editor 106. The user system 108 is implemented using one or more processors and can operate under any of a variety of operating systems that support Java, including, but not limited to, UNIX, Macintosh, and Microsoft Windows. It should be understood that the system 100 can include a plurality of user systems 108. For example, each department in a corporation can have one or more user systems 108 communicatively coupled to the editor 106. The editor 106 receives input from the user system 108 and manipulates data according to the received input. The manipulated data is exchanged with a data model 110 and is stored in a memory by the editor 106. It should be understood that the memory can be implemented using any of a variety of data storage device types, including, but not limited to, semiconductor devices and magnetic and/or optical storage devices. In addition, the memory can incorporate more than one type of data storage device. Furthermore, the data can be stored using any of a variety of paradigms, such as data objects and relational databases.

Figure 18:
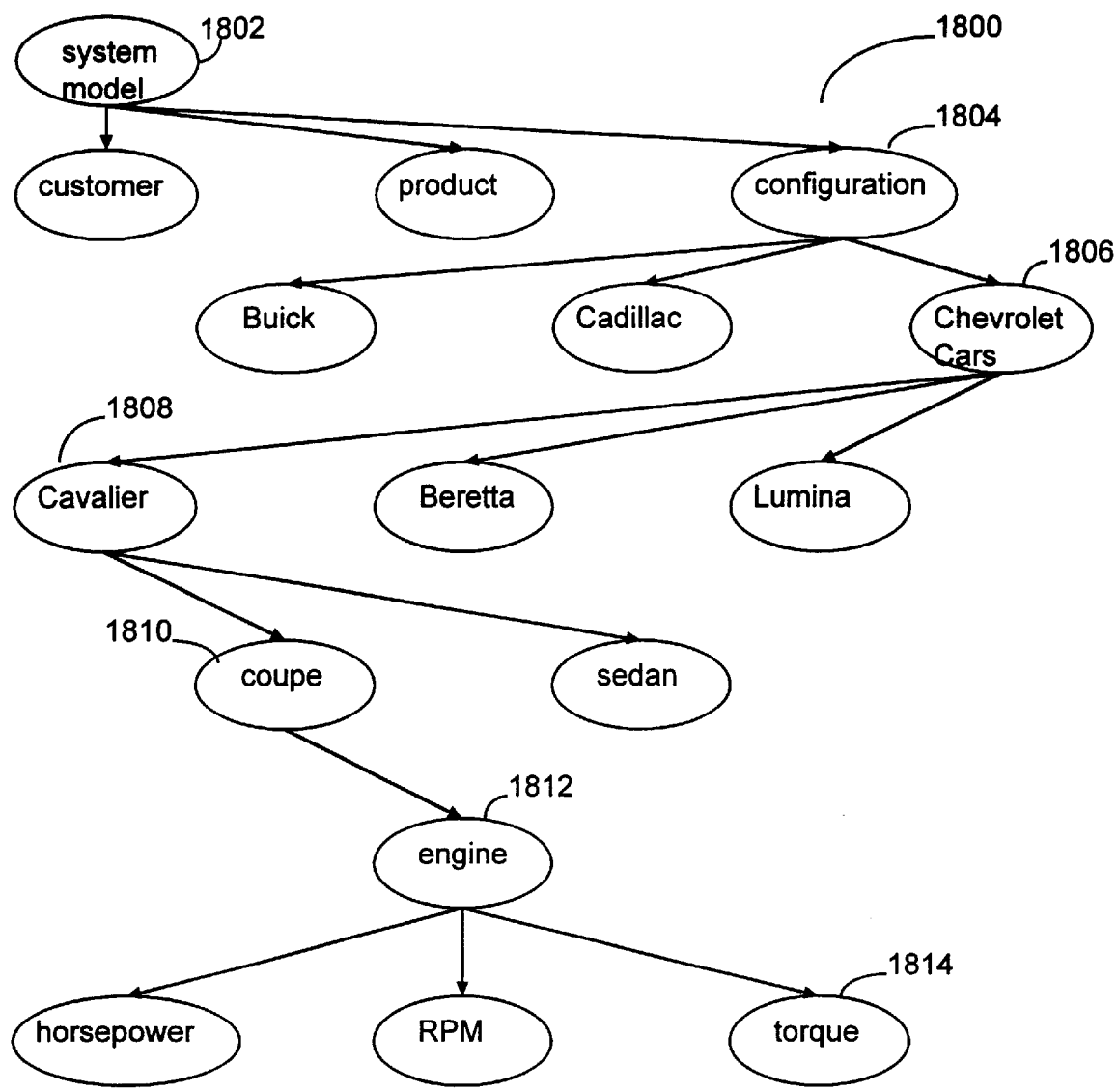
FIG. 18 illustrates an example hierarchy of data instances.

The data model 110 creates and uses an object-oriented programming (OOP) environment to facilitate manipulation of the data by the editor 106. In such an environment, hierarchical relationships between objects can be represented using pointers. Furthermore, objects can be defined as instances of object types. FIG. 18 conceptually illustrates an example hierarchy 1800 of objects. The arrows represent pointers connecting related objects. For example, the top or root level in the example hierarchy of FIG. 18 is occupied by an object 1802 representing the system model. The object 1802 is connected by pointers to its components, which include object 1804 representing customer information, product information, and configuration information. The object 1804 that represents configuration information is in turn connected by pointers to various instance 1806 of configuration information, e.g., Buick, Cadillac, and Chevrolet car information. It should be understood that the hierarchy can contain additional objects other than those illustrated. For example, the objects 1804 that represent customer and product information can themselves have various instances that are omitted from FIG. 18 for purposes of clarity.

The instances 1806 representing Chevrolet cars has a number of instances of its own, which are represented by instance 1808 connected to the instance 1806. The instance 1808 can represent, for example, particular models of Chevrolet cars. Submodels of cars can in turn be represented using instances 1810, which are connected to the corresponding instance 1808.

Objects can also be used to represent components of other objects. For example, the engine of a Chevrolet Cavalier coupe can be represented by an object 1812 that is linked to the object 1810 representing a Chevrolet Cavalier coupe. In addition, objects can represent attributes of other objects. In FIG. 18, objects 1814 represent various attributes of the engine in a Chevrolet Cavalier coupe, such as horsepower, RPM, and torque.

Referring again to FIG. 1, the editor 106 uses rules governing the objects, such as the relationships and other rules governing the objects, to construct a GUI for presenting the information to a user. For example, hierarchical relationships can be represented using levels in a tree-like structure. Instances of an object type can be illustrated similarly using the tree-like structure. It should be understood that other types of rules can be used to construct the GUI. For example, business rules, such as rules describing the compatibility between types of components, can be used to determine the placement of instances within the tree-like structure. The editor also defines a variety of active screen regions, such as dialog boxes, for use in defining relationships between information. These screen regions can include, for example, check boxes, buttons, slide controls, scroll bars, tabs, and other on-screen devices.

Data exporters 112 provide the information, or portions thereof, to a variety of users. The data exporters 112 can vary considerably in the types of information they present. For example, one type of data exporter 112 can be configured and arranged to provide information using the Internet, while another can be designed to generate printed materials, such as catalogues and the like. Still another type of data exporter 112 can use, for example, a technology enabled sales (TES) system to provide information to salespersons. In addition to these types, other types of data exporters 112 can be used to present selected information to a variety of audiences.

Figure 2:
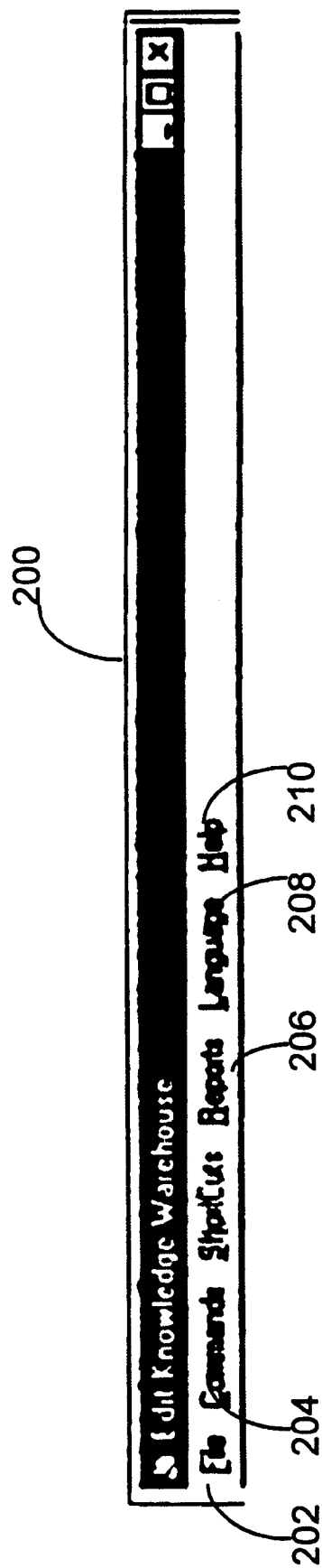
FIG. 2 illustrates an example menu bar that can be used to implement part of the system of FIG. 1, according to an embodiment of the present invention.
Figure 3:
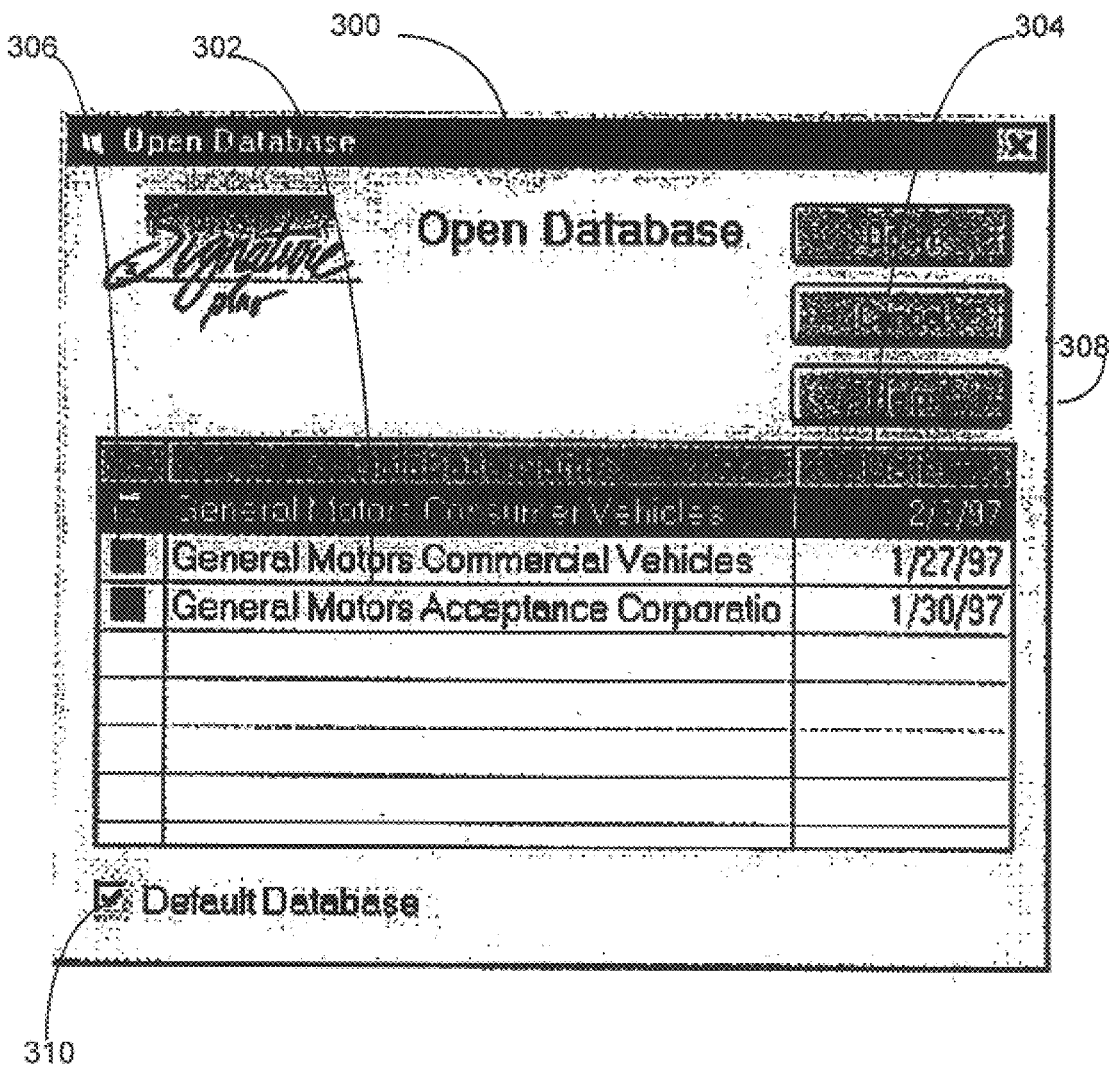
FIG. 3 illustrates an example dialog box for use in connection with the example menu bar of FIG. 2, according to an embodiment of the present invention.

FIG. 2 illustrates an example menu bar 200 that can be used to implement part of the system of FIG. 1 according to an embodiment of the present invention. The menu bar 200 includes a number of active screen regions that, when activated by, for example, a mouse or other pointing device, cause pull-down menus to be displayed. A file menu activator 202, when activated, provides access to a variety of file control operations, including, operating and closing of databases, file conversion, and exiting from the system. For example, when the user selects an "Open Database" option, a dialog box is displayed. An example dialog box 300 for use in opening a database is illustrated in FIG. 3. In the dialog box 300 of FIG. 3, a column 302 lists the names of the available databases, and a column 304 indicates the date on which each database was last updated. An indicator column 306 uses an icon to indicate the database that is currently open. The user can open a database by, for example, double-clicking on the name of the desired database or by highlighting the name and clicking on an "Open" button 308. By checking a check box 310, the user can specify that the currently open database should be opened as a default database whenever a particular user enters the editor.

Referring again to FIG. 2, a command menu activator 204 allows users to display the hierarchy of instances of data objects in the data model using a cascading popup menu. In addition, users with sufficient access rights can, for example, remove locks left in the database by abnormal exiting of the system.

By using a reports menu activator 206, a user can generate reports using one or more formats for summarizing the contents of the database and logging database activity. A variety of formats are available. For example, in one format, the report lists the names of each object in the database, the parent object corresponding to each object, and the number of attributes in each object. In another format, the reported lists of all the attributes of all of the objects, as well as the properties of each object. In still another format, the contents of every instance of every object in the database are displayed. Using the reports menu activator 206, the user can also search the database for all instances that contain, for example, a specified code.

The menu bar 200 can include a number of additional menu activators. For example, the menu bar 200 illustrated in FIG. 2 includes a language menu activator 208 that allows the user to select a language for interfacing with the database. A help menu activator 210 provides access to a searchable help file.

Figure 4:
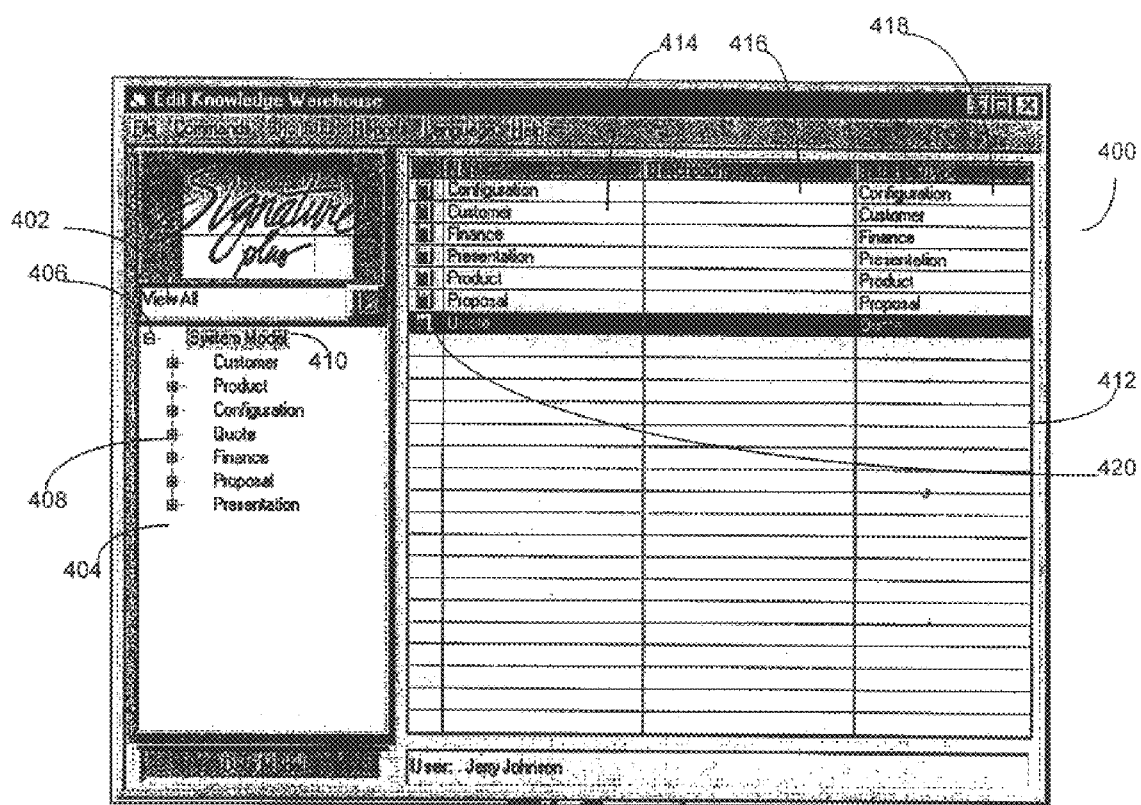
FIG. 4 illustrates an example graphic user interface (GUI) for use in connection with the system of FIG. 1, according to an embodiment of the present invention.

FIG. 4 illustrates an example GUI 400 for use in connection with the editor 106 of FIG. 1. The GUI 400 enables the user to select from a variety of formats known as structures or views for viewing and organizing data in the database by using a cascading popup format selector 402. These structures or views are based on a data-driven data model and are derived from the hierarchy of data instances within the data model and from the relationships between the instances. Selecting an item in the cascading popup format selector 402 repopulates the hierarchy based on a starting point, such as the first item in the hieararchy, in the data model.

In the example GUI 400 of FIG. 4, the user has selected a view that allows viewing of the entire hierarchy. With this view selected, the user can traverse through a tree-like structure 404 that represents the hierarchy. If submodels of the data model exist, the cascading popup format selector 402 displays an additional cascaded level to enable the user to view individual submodels.

Using a mouse or other pointing device, the user can view different levels of the hierarchy by using a collapse button 406 and/or an expansion button 408. For example, actuating the collapse button 406 causes the objects uder, for example, the "System Model" object to be hidden. Conversely, actuating the expansion button 408 reveals any instances of the selected object, e.g., the "Quote" object. Any such instances can be displayed as lower levels in the hierarchy. The manner in which objects and instances are presented in the GUI 400 is determined by the relationships between the instances of the data objects. It should be understood that alternative views can be selected, such as a view that displays classes of objects.

The user can highlight an object in the tree-like structure 404 to flag it as a selected object 410 for in-depth viewing and editing. In the example GUI 400 of FIG. 4, the user has selected the "System Model" object. A navigational grid 412 is repopulated with the children objects or instances of the selected object 410, allowing the user to edit the contents of the selected object 410. In the navigational grid 412, a name column 414 displays the names of the instances. A description column 416 displays the descriptions of the instances, as contained, for example, in a "Use a Description" attribute of the instances. If an instance has pointers, but has no attributes flagged as a description or name, the description column 416 displays the first attribute in the instance as the description of the instance. An instance type column 418 displays the types of the instances as assigned by the data modeler. If an instance has children objects of its own, an indicator column 420 displays an active icon that allows the user to view them.

By highlighting an instance in the navigational grid 412 and activating a secondary function of the pointing device, e.g., "right-checking" on a selected instance, the user can invoke a popup menu (not shown). This popup menu provides access to various operations for manipulating instances. Such operations include, for example, deleting objects, sorting objects, and filtering objects.

Figure 5:
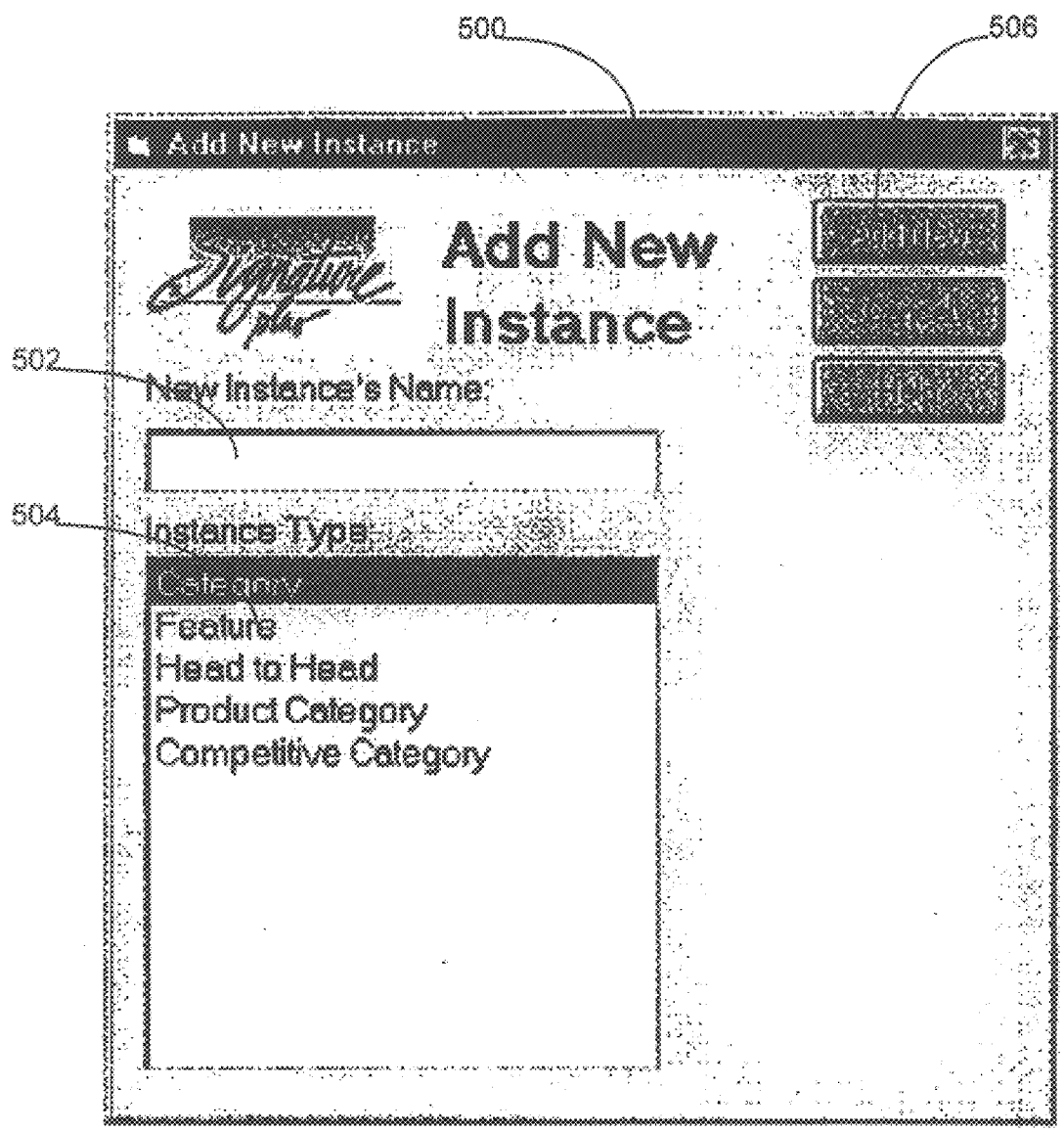
FIG. 5 illustrates an example dialog box for use in connection with the GUI of FIG. 4, according to an embodiment of the present invention.

Other operations can be accessed using the popup menu. For example, the user can invoke a dialog box 500 of FIG. 5 to add new instances. The dialog box 500 contains a text entry field 502 for entering the name of a new instance. The user can then select the type of the new object using an instance type list box 504. After entering the name and type of the new object, the user can actuate a button 506 to add the object and exit the dialog box 500.

Figure 6:
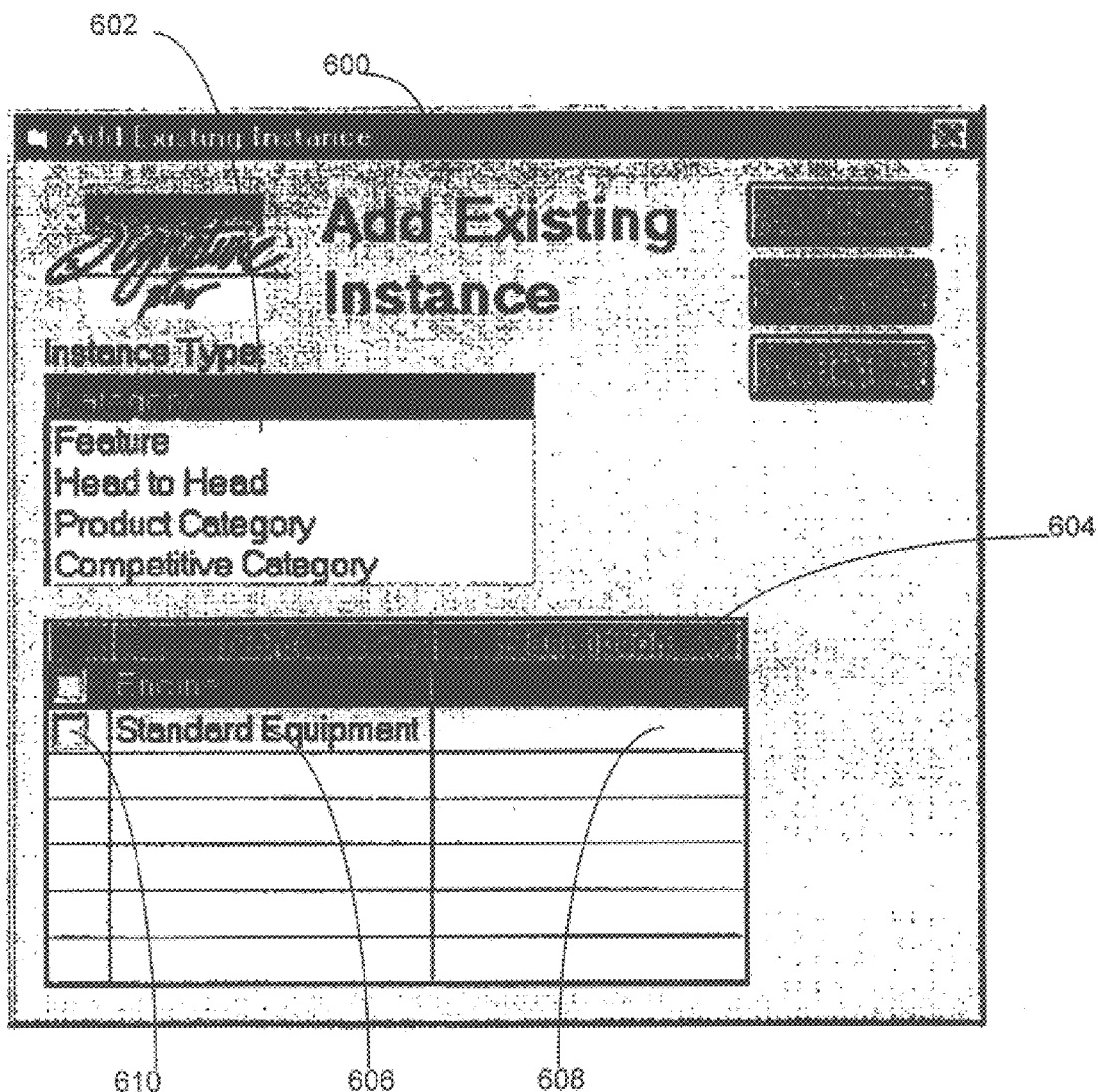
FIG. 6 illustrates another example dialog box for use in connection with the GUI of FIG. 4, according to an embodiment of the present invention.

The user can also use the popup menu to invoke a dialog box 600 of FIG. 6 to attach an existing instance to the selected instance. An instance type list box 602 allows the user to select the type of the existing object to be attached. Upon selection of a type, an available instances list box 604 lists the objects of the selected type. A name column 606 displays the names of the objects of the selected type, and a description column 608 displays their descriptions. The user can then use check boxes 610 to select one or more objects of the selected type to attach to the selected instance.

Figure 7:
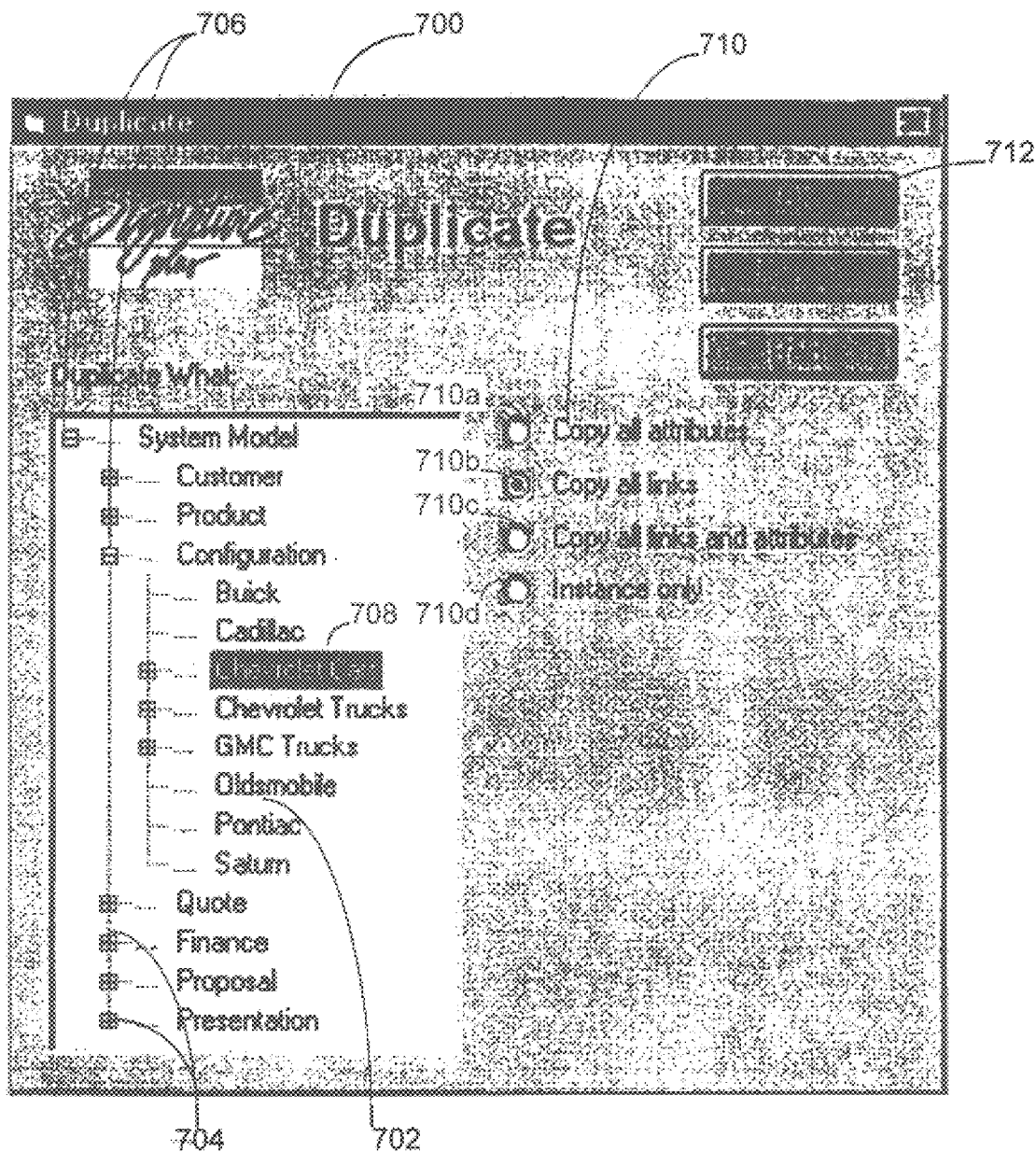
FIG. 7 illustrates another example dialog box for use in connection with the GUI of FIG. 4, according to an embodiment of the present invention.

The popup menu can also be used to invoke a dialog box 700 of FIG. 7 for duplicating instances. A tree-like structure 702 displays the hierarchy of instances of data objects. Expansion buttons 704 and collapse buttons 706 respectively allow the user to expand and collapse levels in the tree-like structure 702. By highlighting an object, the user marks it as a selected object 708. The selected object 708 can then be duplicated in whole or in part. The amount of the selected object 708 to be duplicated can be controlled using radio buttons 710. For example, by selecting one radio button 710*a*, the user can choose to duplicate all attributes of the selected object 708. By selecting another radio button 710*b*, the user can duplicate all links of the selected object 708. Still another radio button 710*c* allows the user to duplicate both attributes and links of the selected object 708. Yet another radio button 710*d* allows the user to duplicate only the selected object 708 itself. By actuating a button 712, the user causes the system to create an instance that is identical to the selected object 708. The pointers of the duplicate object point to the same instances as the pointers of the selected object 708.

Figure 8:
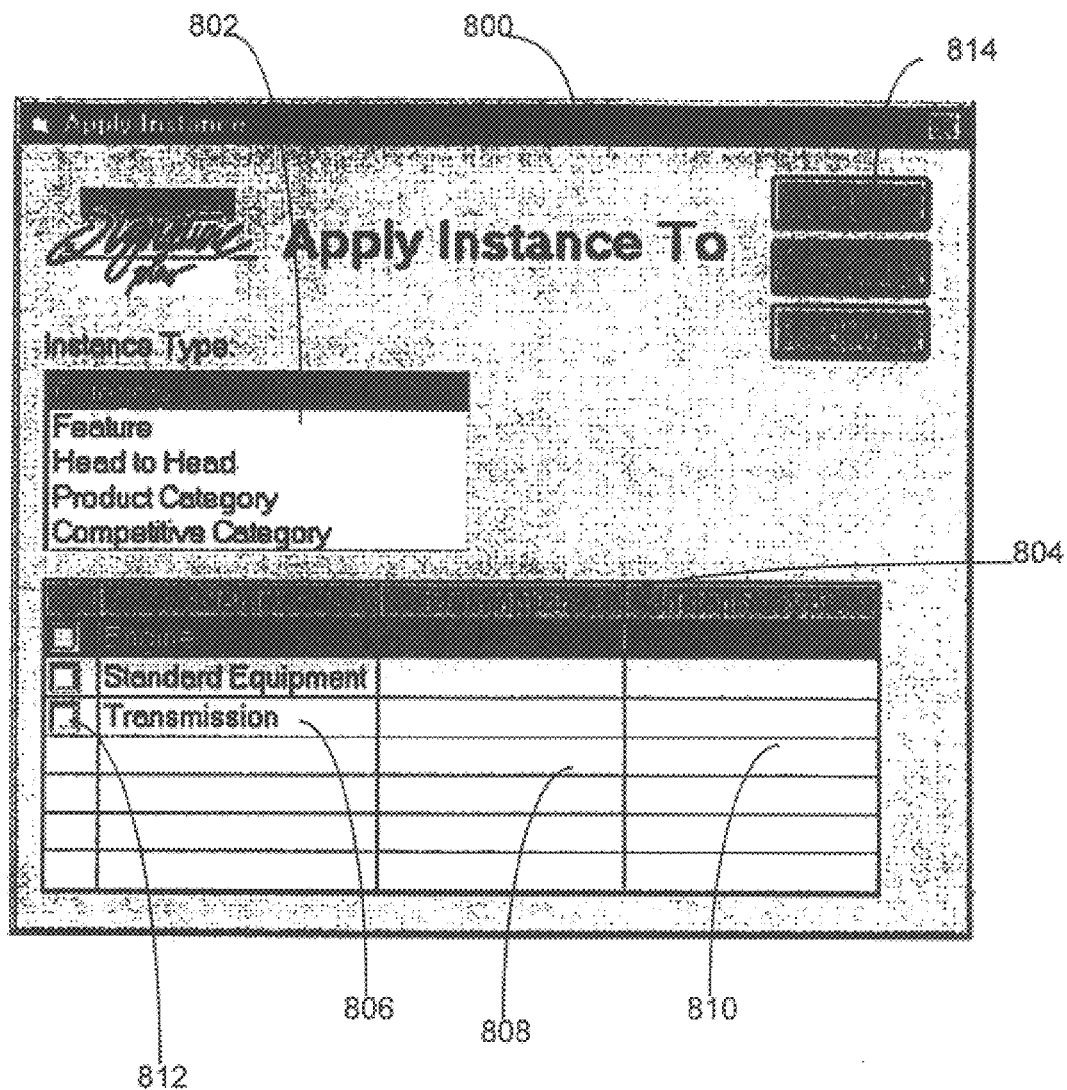
FIG. 8 illustrates another example dialog box for use in connection with the GUI of FIG. 4, according to an embodiment of the present invention.

The user can also use the popup menu to invoke a dialog box 800 of FIG. 8 to attach an instance to, for example, predefined groups or markets. An instance type list box 802 allows the user to select the type of the instance to be attached. Upon selection of a type, an available group list box 804 lists the groups to which the instance type can be attached. A name column 806, a description column 808, and an instance type column 810 respectively display the names, descriptions, and types of the available groups. The user can then use check boxes 812 to select one or more groups to which the selected instance is to be attached. By actuating a button 814, the user can attach the selected instance to the selected group or groups and exit the dialog box 800.

Figure 9:
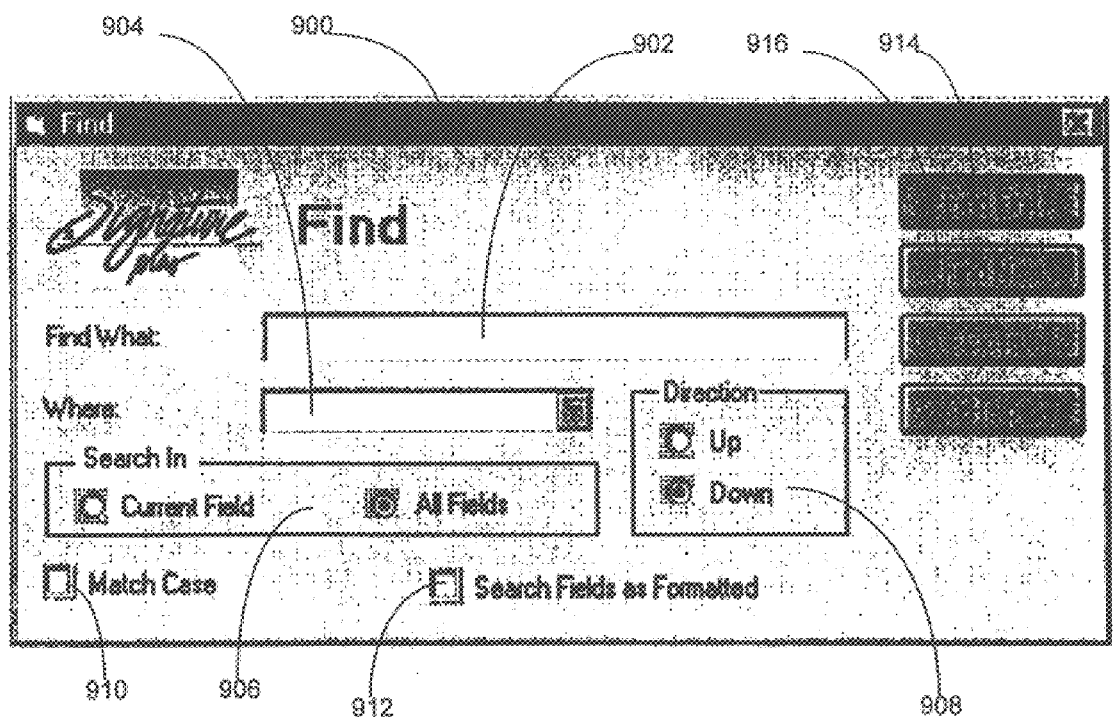
FIG. 9 illustrates another example dialog box for use in connection with the GUI of FIG. 4, according to an embodiment of the present invention.

The popup menu can also access a dialog box 900 of FIG. 9 for use in searching for an instance. A text entry field 902 allows the user to enter target next to be located. A pull-down menu 904 allows the user to specify the areas to be searched for the target text, and radio buttons 906 can be used to specify whether the search is to cover all fields or the current field only. Radio buttons 908 are used to specify the direction (i.e., up or down) of the search. Check boxes 910 and 912 respectively allow the user to specify whether the search is to be case-sensitive and/or formatting-sensitive. A button 914 allows the user to search for the first occurrence of the target text. Subsequent occurrences can be found using a button 916.

Figure 10:
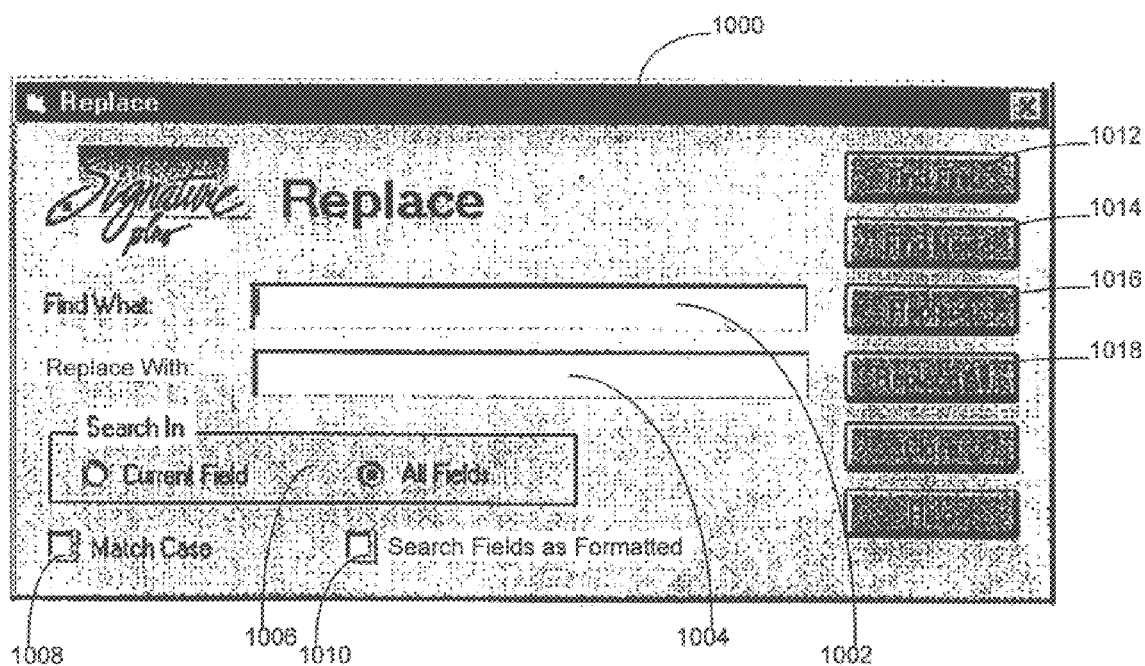
FIG. 10 illustrates another example dialog box for use in connection with the GUI of FIG. 4, according to an embodiment of the present invention.

A dialog box 1000 of FIG. 10 provides access to replace functions. Text entry fields 1002 and 1004 respectively allow the user to enter target text to be found and replacement text for substitution in place of the target text. Radio buttons 1006 allows the user to confine the search to the current field, or to specify that the search is to cover all fields. Check boxes 1008 and 1010 are respectively used to specify whether the search is to be case-sensitive and/or formatting sensitive. The user can actuate buttons 1012 and 1014 to find the first and subsequent occurrences of the target text, respectively. Actuating a button 1016 causes the target text to be replaced by the replacement text for the selected occurrence, and actuating a button 1018 causes all occurrences of the target text to be replaced by the replacement text.

Figure 11:
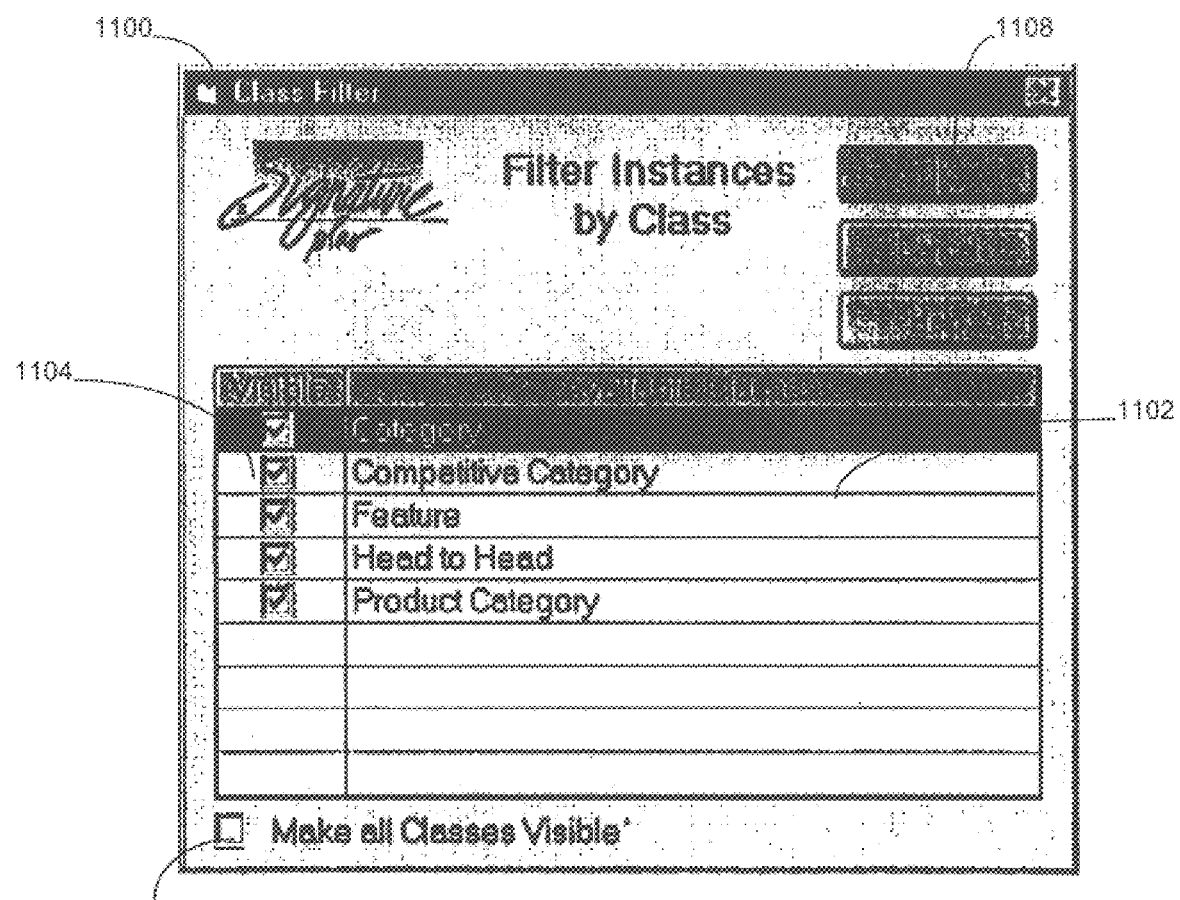
FIG. 11 illustrates another example dialog box for use in connection with the GUI of FIG. 4, according to an embodiment of the present invention.

The popup menu can also be used to invoke a dialog box 1100 of FIG. 11 for filtering instances by class. An available class column 1102 displays the classes of instances that are available for display. Using check boxes 1104, the user can select which classes are visible. A check box 1106 allows the user to specify that all classes should be visible. By actuating a button 1108, the user confirms his or her selection.

Figure 12:
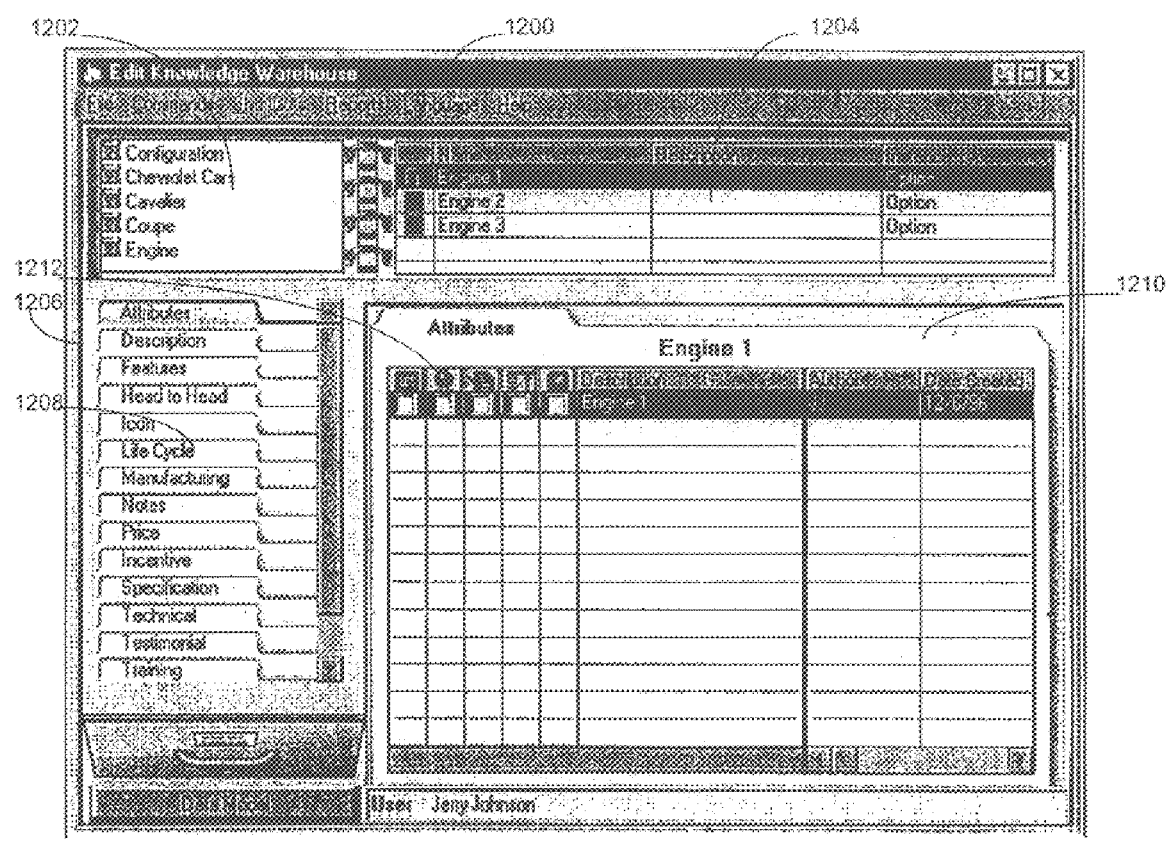
FIG. 12 illustrates another example graphic user interface (GUI) for use in connection with the system of FIG. 1, according to an embodiment of the present invention.

FIG. 12 illustrates another example GUI 1200 for use in connection with the editor 106 of FIG. 1. The GUI 1200 can be invoked, for example, by double-clicking on a selected instance in the GUI 400 of FIG. 4. The GUI 1200 allows the user to view information that is related to the instance selected using the GUI 400 of FIG. 4.

The GUI 1200 can be conceptually divided into a number of screen regions. A navigational path list 1202 and a navigational grid 1204 are used to navigate through the hierarchy of instances of data objects based on a user-selected view. In the navigational path list 1202, selecting an instance of the hierarchy by, for example, double-clicking, causes the navigational grid 1204 to display instances related to the selected instance. Selecting an instance also caused subordinate instances to be hidden on the navigational path list 1202. Accordingly, the selected instance appears at the bottom of the navigational path list 1202, and its related instances appear in the navigational grid 1204.

In the navigational grid 1204, the user can select or edit an instance by, for example, single- or double-clicking on the instance. A related instances folder list 1206 displays instances related to the selected instance as active tabs 1208. By selecting an active tab 1208, the user causes the corresponding instance and its attributes to be displayed in a grid 1210. Other information is optionally displayed in the grid 1210, such as information regarding activity related to the selected instance. In addition, check boxes 1212 allow the user to define the exportability of the related instances. For example, the user can specify whether the related instances can be exported over the Internet, computerized sales systems, kiosks, and the like. The contents of the folder list 1206 and the grid 1210 change in response to changes in the selection of an instance.

The user can also access a popup menu (not shown) by, for example, right-clicking on an instance in the navigational grid 1204 or the grid 1210. This popup menu is similar in structure and functionality to the popup menu invoked in connection with the GUI 400 of FIG. 4 and is used to invoke dialog boxes similar to those illustrated in FIGS. 5–11. Accordingly, discussion of the popup menu invoked in connection with the navigational grid 1204 and the grid 1210 is omitted in the interest of brevity.

Figure 13:
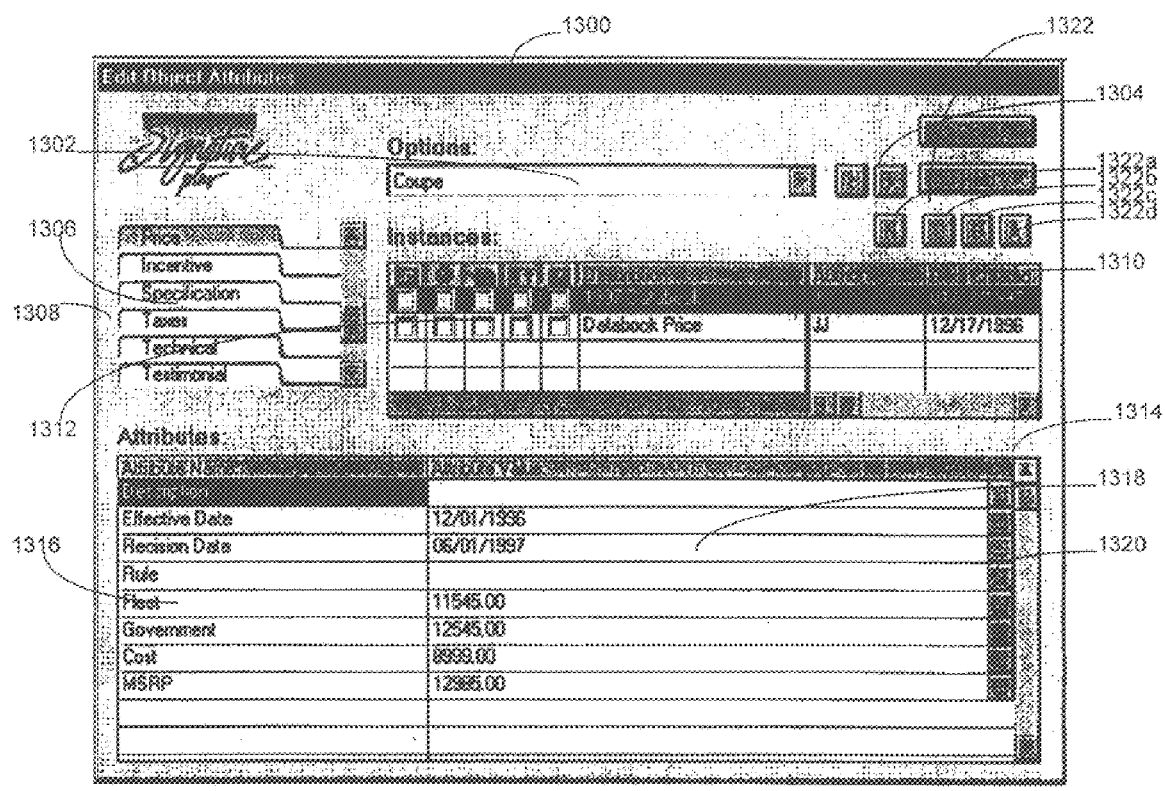
FIG. 13 illustrates an example GUI for use in viewing and modifying the individual attributes of an instance, according to an embodiment of the present invention.

FIG. 13 illustrates an example GUI 1300 for use in viewing and modifying the individual attributes of an instance. The functions that can be accessed using the GUI 1300 are similar to those made available for editing instances by the GUI 400 of FIG. 4. In addition, the user can use the GUI 1300 to edit individual attributes of a selected instance. The GUI 1300 also provides access to dialog boxes such as those illustrated in FIGS. 14–17 to facilitate entry of certain types of attributes and definition of rules governing instances. Furthermore, the GUI 1300 provides shortcuts into commonly used functions.

A pull-down menu 1302 allows the user to display and navigate between the current instance and its siblings. The contents of the menu 1302 reflect the contents of the navigational grid 412 of FIG. 4. The list of sibling instances can be navigated using buttons 1304. Instances associated with the selected instance are organized as folders 1306 in a folder list 1308. The user can select an instance to view and edit by clicking on a folder 1306. A grid 1310 display attributes of the current instance selected in the menu 1302. The grid 1310 also displays attributes of associated instances sorted by class. In addition, check boxes 1312 can be used to control the exportability of the selected instance to a variety of exporters.

The grid 1310 can also be used to access a popup menu (not shown) by, for example, right clicking on an instance. This popup menu can be used to manipulate the selected instance in a variety of ways. For example, the instance can be cut or copied to a clipboard or deleted. Instances can also be pasted from the clipboard using the popup menu. In addition, the popup menu can be used to add a new instance of the class selected in the folder list 1308.

An attributes grid 1314 allows the user to display and edit the attributes of an instance. Columns 1316 and 1318 respectively display names and associated values of the attributes. A set of buttons 1320 are used to access dialog boxes to facilitate data entry. The buttons 1320 can access, for example, the dialog boxes shown in FIGS. 14–17. Right-clicking on an attribute within the attributes grid 1314 invokes a popup menu that can be used to manipulate the attribute in a variety of ways. For example, the value of the attribute can be cut or copied to the clipboard or cleared. In addition, a value stored on the clipboard can be pasted to the attribute. Moreover, the dialog boxes shown in FIGS. 14–17 can be accessed using the popup menu.

Function buttons 1322 provide shortcuts into commonly used functions. For example, a function button 1322*a* allows the user to create a new instance of the class selected in the folder list 1308. Another function button 1322*b* provides the ability to copy the current instance, while still another function button 1322*c* allows the user to delete the current instance. Yet another function button 1322*d* invokes the dialog box 800 of FIG. 8 for use in attaching the current instance to a group or groups. It should be understood that the GUI 1300 can incorporate function buttons 1322 of other types.

Figure 14:
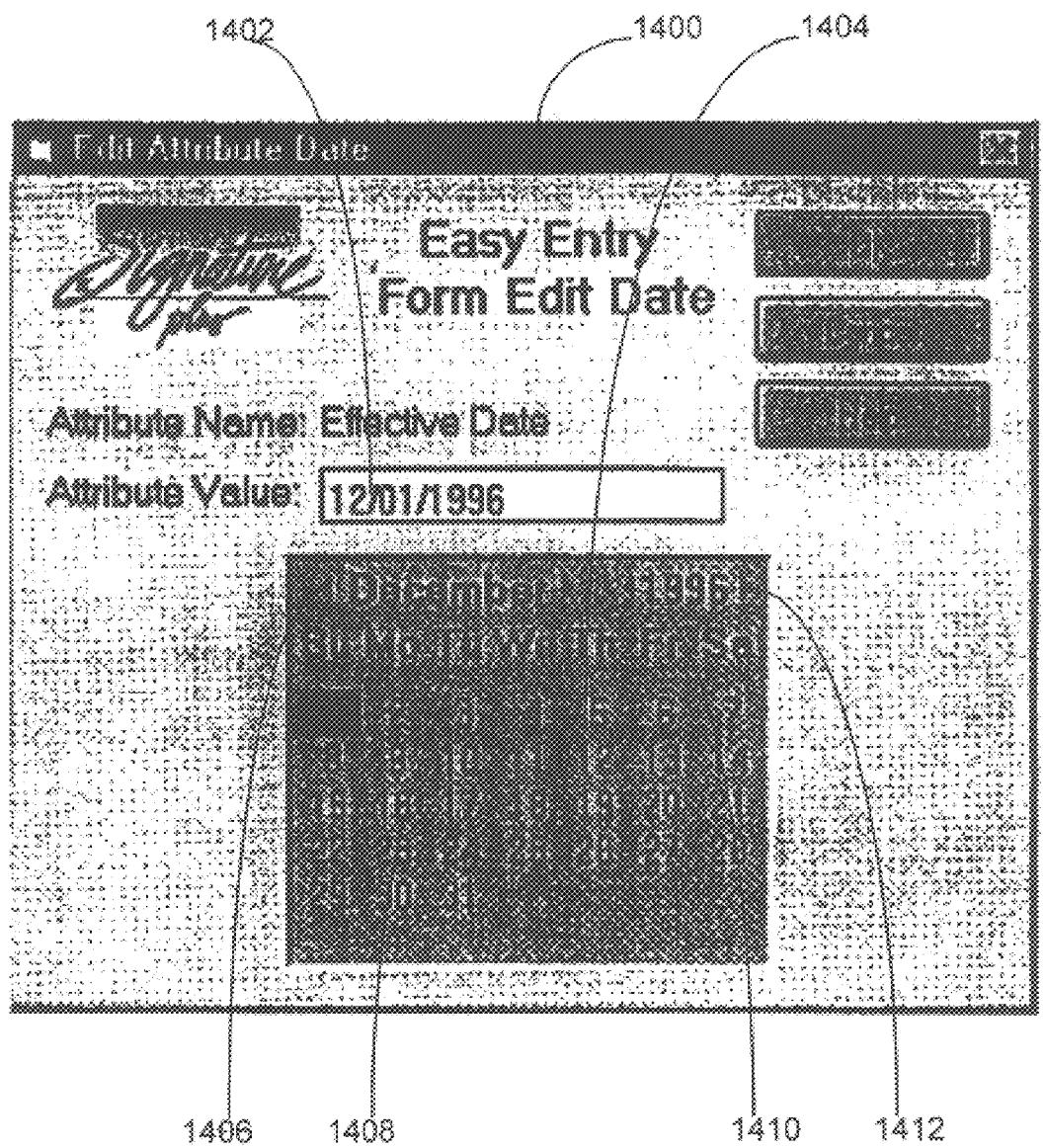
FIG. 14 illustrates an example dialog box for use in connection with the GUI of FIG. 13, according to an embodiment of the present invention.

FIG. 14 illustrates an example dialog box 1400 for entering dates into the database. The user can enter dates using a text entry field 1402. Alternatively, the user can use a calendar 1404. The calendar includes month scroll buttons 1406 and 1408 for scrolling backward and forward through a list of months. Year scroll buttons 1410 and 1412 allows the user to scroll backward and forward through a range of years. The calendar 1404 displays the days of the month selected using the scroll buttons 1406, 1408, 1410, and 1412. The user can then select a particular date within the month by highlighting it.

Figure 15:
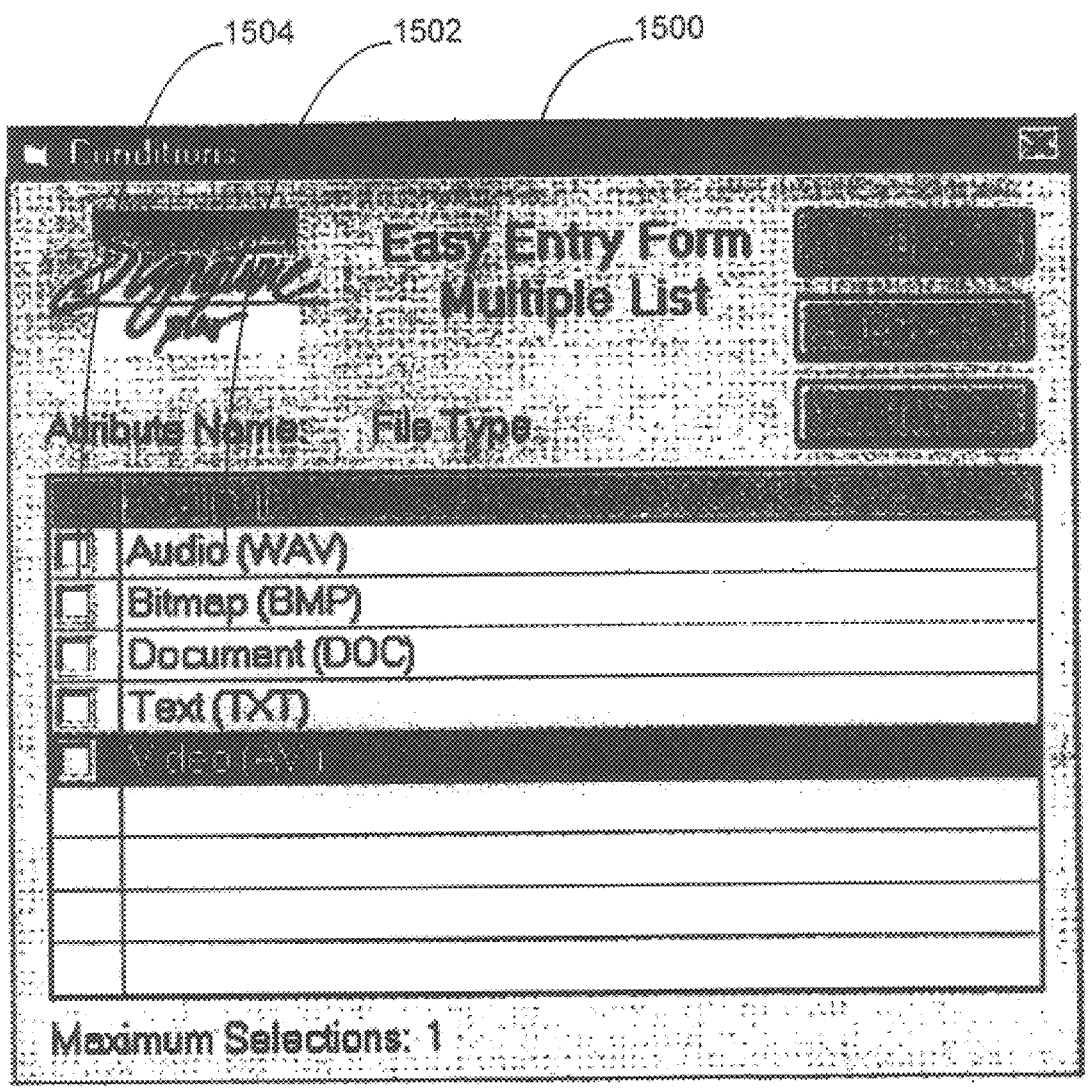
FIG. 15 illustrates an example dialog box for use in connection with the GUI of FIG. 13, according to an embodiment of the present invention.

FIG. 15 illustrates an example of dialog box 1500 for selecting file types associated with an instance. The dialog box 1500 includes a column 1502 that displays available file types, e.g., audio, bitmap, document, text, and video. Check boxes 1504 are used to select one or more file types to associate with the instance.

Figure 16:
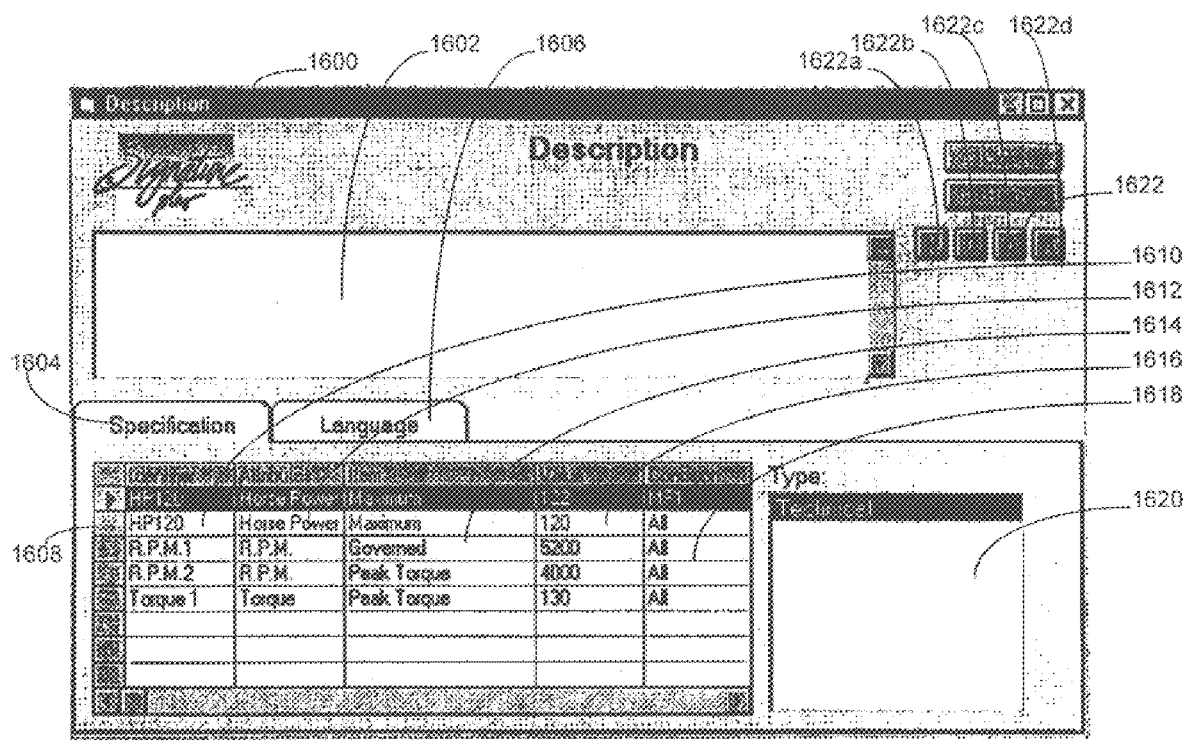
FIG. 16 illustrates an example dialog box for use in connection with the GUI of FIG. 13, according to an embodiment of the present invention.

FIG. 16 illustrates an example dialog box 1600 for use in associating attribute values with descriptors. A text entry field 1602 allows the user to enter a text description of an attribute. The dialog box 1600 also includes a set of tabs 1604 and 1606 that respectively allow the user to associate values and descriptors and to select languages for the descriptions. Using the tab 1606, the user can enter a plurality of descriptions in different languages for a single attribute.

The tab 1604 contains a grid 1608 of descriptors and values. An identifier column 1610 lists the descriptors that are associated with attribute values. An attributes column 1612 lists the attribute type of each descriptor, and an item column 1614 further describes the associated value, e.g., "Governed RPM." The associated values are displayed in a value column 1616, and conditions or rules under which the associated values apply are displayed in a condition column 1618. The values, descriptors, and conditions can be edited by clicking on cells in the grid 1608. A menu 1620 allows the user to select types of descriptors, e.g., technical descriptors, to be displayed.

Function buttons 1622 provide shortcuts into commonly used functions. For example, a function button 1622a allows the user to create a new descriptor and associated value. Another function button 1622b provides the ability to copy the current descriptor and associated value, while still another function button 1622c allows the user to delete the current descriptor and associated value. Yet another function button 1622d invokes the dialog box 800 of FIG. 8 for use in attaching the current descriptor and associated value to a group or groups. It should be understood that the dialog box 1600 can incorporate function buttons 1622 of other types.

Figure 17:
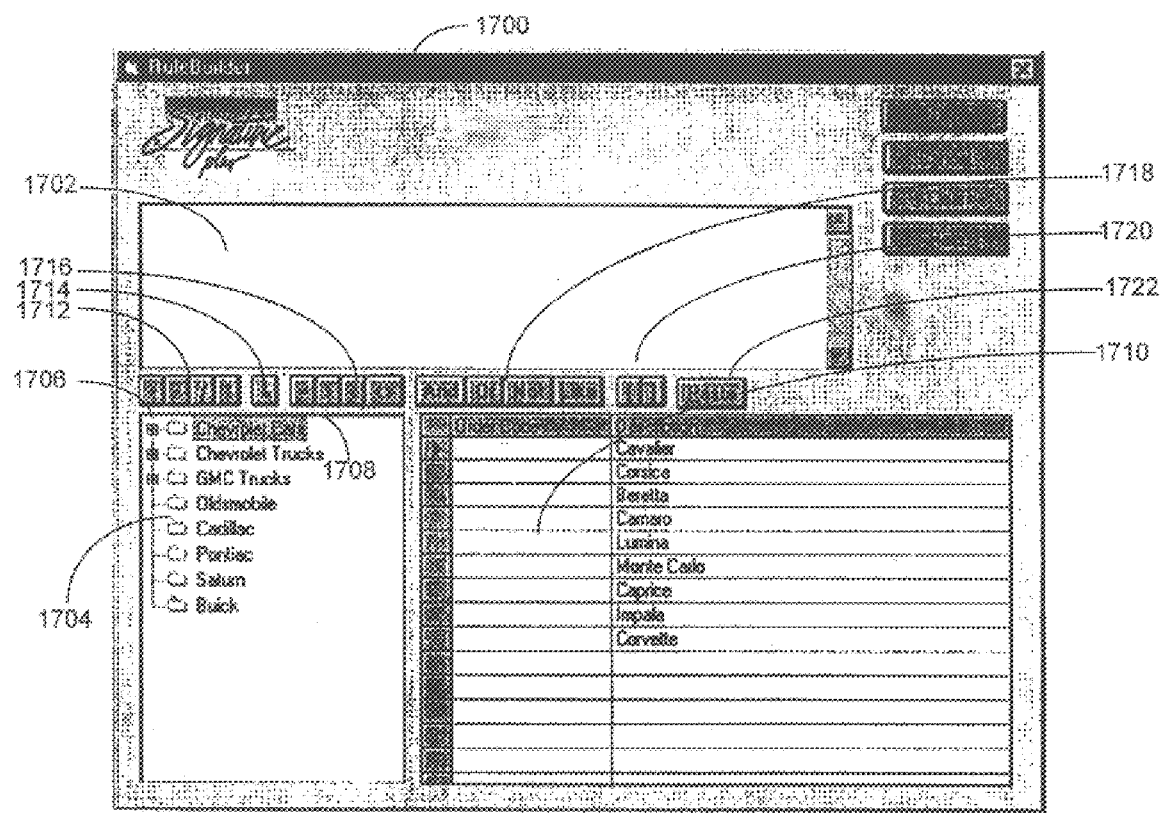
FIG. 17 illustrates an example dialog box for use in connection with the GUI of FIG. 13, according to an embodiment of the present invention.

FIG. 17 illustrates an example dialog box 1700 for use in defining rules that describe relationships between information. For example, using the dialog box 1700, the user can define a relationship between one type of data object representing product lines and another representing technical specifications. The relationships between instances of data objects, in combination with the instances themselves, are used in defining the hierarchy of instances of data objects. A text entry box 1702 allows the user to enter rules in textual form. Alternatively, the user can use a variety of active screen regions to reduce the number of keystrokes involved in defining a rule. For example, a tree-like structure 1704 representing the hierarchy of instances can be used to select objects that are to be inserted in the rule definition. Clicking on an expansion button 1706 expands a level of the hierarchy. Instances associated with a selected object 1708 are displayed in an associated instances grid 1710. The associated instances and their attributes can also be inserted in the rule definition.

The dialog box 1700 also includes a variety of buttons that can be used in place of keystrokes in defining rules. A set of arithmetic operator buttons 1712 allow the user to insert arithmetic operators into the rule definition. Similarly, an address-of (&) operator button 1714 allows the user to insert an address-of operator, which returns the address of its operand, into the rule definition. Comparison operator buttons 1716 provide access to operations that compare objects. A set of logical operator buttons 1718 allow the user to insert logical operations into the rule definition. Precedential operator buttons 1720 allow the user to define the order in which operations are performed in the rule definition. A paste button 1722 enables the user to paste text from the clipboard to the rule definition. This button is particularly useful for defining rules that are similar.

In accordance with another aspect of the present invention, the system can assign access rights to various users of the system. The system recognizes several types of users with differentiated access rights. Examples of types of users include, but are not limited to, system administration, database administrators, data model owners, product managers, product experts, and data entry clerks. Each type of user is responsible for certain goals of the system. For example, the system administrator is responsible for system management, while the data entry clerk is responsible for data management. Some users, such as the database administrator, can be responsible for both system and data management.

One type of user recognized by the system is the system administrator. The system administrator is responsible for both user and database administration. To assist the system administrator in user administration, the system provides a number of functions to the system administrator. For example, the system administrator can define access rights on an instance basis. Accordingly, the system administrator can grant a particular user rights to access and manipulate one instance of an object that represents a particular product line, while withholding access rights to another instance of the same object that represents a different product line. This ability to grant differentiated access rights to instances of a single object type is particularly advantageous, for example, in environments in which employees work only on selected product lines. It should be understood that granting rights to access a particular instance of a data object typically, but not necessarily, impliedly grants rights to access subordinate instances in the hierarchy. In addition, the system administrator can add, delete, and edit users. Certain functions, such as searching for users, are implied by these abilities. The system also allows the system administrator to perform certain database administration functions, such as backing up the database.

Another type of user recognized by the system is the database administrator, who is responsible for database administration. Like the system administrator, the database administrator can backup the database. Moreover, the database administrator has access to a variety of additional database administration functions. For example, the system allows the database administrator to create new databases and to edit or delete existing databases. Furthermore, the database administrator can duplicate existing databases. The system also enables the database administrator to recover a database from a backup. The database administrator also has access to certain functions that facilitate maintaining database security. For example, the database administrator can use, display and clear an activity log known as an audit trail to monitor accesses to the database and operations performed on the database.

The system also recognizes a data model owner, who assumes some responsibility for managing the data in the database. To facilitate the fulfillment of this responsibility, the system allows the data model owner to generate reports that list the objects in the database and their attributes, as well as the data continued in a selected object. In addition, the data model owner can view all of the data in the database. The data can be viewed either by class or by instances of a class. The instances can be searched, replaced, sorted, edited, or moved between classes. When the user moves an instance between classes, the system attempts to insert instance data into shared attributes. If the destination class is a child of the source class, any additional attributes in the destination class are left empty. If, on the other hand, the destination class is a parent of the source class, any additional attributes in the source class are deleted. If the destination and source classes are unrelated, certain attributes may be either left empty or deleted. The system attempts type coercion to make data fit into the attributes of the destination class.

Instances that use a selected instance or that are used by the selected instance can also be displayed. In addition, the pointers that point to an instance can be viewed. The data model owner can also modify the data model by adding, deleting, or editing classes and instances. In addition, the data model owner can define relationships between the objects, such as hierarchical and inheritance relationships. Other types of relationships include, for example, constraints on the number of instances of a particular object type that can be associated with a given instance of another object type. For example, the data model owner can specify that only one instance of an Engine object can be associated with a given instance of a Car object. Furthermore, the data model owner can define access rights to the data, view the data, and export the data to other users.

The product manager also assumes some responsibility for managing the data in the database. Accordingly, the product manager can generate reports that summarize the data in the database and view the data contained in a selected object or all of the data in the database. In addition, the product manager can import data from various sources and export data to various destinations.

The product expert also assumes some responsibility for managing the data. Accordingly, the product expert can generate reports that summarize the contents of the database and that list all occurrences of an instance in the database. The product expert can also import data from various sources and view the data contained in a selected object. Alternatively, the product expert can view all of the data in the database. In addition, the product expert can modify the data, for example, to keep the data up to date. For example, the product expert can add, delete, or edit pointers and rules that represent relationship between the data. The system also recognizes a data entry clerk, who can also view and modify the data. Both the product expert and the data entry clerk can modify data of many types, including, e.g., floats, double-precision values, short and long integers, text, descriptions, real values, and Boolean values. In addition, the product expert can modify string expressions and calculations attributes.

By recognizing different types of users with different access rights defined on an instance basis, the system can ensure that each type of user can perform the tasks assigned to him or her, while maintaining database security. The risk of compromising the integrity of a centralized database is thereby reduced. Appendix A contains a listing of various example objects that can be used to implement the present invention. The various embodiments described above are provided by way of illustration only and should not be construed to limit the invention. For example, the particular user interfaces described above and depicted in the figures are not intended to limit the scope of the present invention. Those skilled in the art will readily recognize various modifications and changes that may be made to the present invention without strictly following the example embodiments and applications illustrated and described herein, and without departing from the true spirit and scope of the present invention, which is set forth in the following claims.

What is claimed is:

1. A computer program product readable by a computing system and encoding a set of computer instructions implementing a method for managing product knowledge comprising a plurality of data items related to products offered for sale by a selling entity, the computing system including a memory arrangement and at least one processing unit, the method comprising:

defining a data model of data categories, the data model establishing relationships between data categories;

receiving in the computer system one or more particular data items corresponding to one or more of the data categories;

receiving user-defined relationship information for the particular data item, the relationship information relating the particular data item to one or more other data items; and presenting the product knowledge, including information about the particular data item, to a user of the system in a manner established by the data model and the user-defined relationship;

wherein the data model is constructed from one or more data instance items interconnected using the user-defined relationship items for each data instance item.

2. A computer program product, according to claim 1, further comprising providing one or more data instances to at least one of the memory arrangement and the at least one processing unit.

3. A computer program product, according to claim 1, further comprising selectively presenting at least a portion of the product knowledge to a plurality of users of the system, each of the plurality of users receiving a respective portion of the product knowledge in a format selected as a function of the respective portion of the product knowledge.

4. A computer program product, according to claim 1, further comprising creating data objects representing the data categories.

5. A computer program product, according to claim 4, wherein the data objects contain rule objects that describe the relationships between the data categories.

6. A computer program product, according to claim 5, further comprising defining pointers for use in describing the relationships between the data categories, the pointers linking the data objects.

7. A computer program product, according to claim 1, further comprising selecting a portion of the product knowledge for presentation to the user.

8. A computer program product, according to claim 7, further comprising selecting the portion of the product knowledge in a manner established by the data model and the user-defined relationship.

9. A computer program product, according to claim 8, wherein the data instance contains attribute objects for use in selecting the portion of the product knowledge for presentation to the user.

10. A computer program product, according to claim 9, further comprising allowing the user to select one or more of the attribute objects.

11. A computer program product, according to claim 1, further comprising presenting differentiated portions of the product knowledge to each of a plurality of users of the system in manner established by the data model and the user-defined relationship.

12. A computer program product, according to claim 1, further comprising using a graphic user interface configured and arranged to facilitate creating the user-defined relationship item.

13. A computer program product, according to claim 12, wherein the graphic user interface comprises at least one of a wizard, a shortcut, a builder, and a user-defined form.

14. A computer program product, according to claim 1, further comprising defining an association between a descriptor and an associated value.

15. A computer program product, according to claim 1, further comprising selectively granting differentiated access rights to respective data instances corresponding to one or more of the data categories.

16. A computer program product, according to claim 1, wherein the computer data product comprises a set of computer instructions encoded and stored onto a computer-readable storage medium.

17. A computer program product, according to claim 1, wherein the computer data product comprises a set of computer instructions encoded within a carrier wave for transmission between two computing systems.

* * * * *

UNITED STATES PATENT AND TRADEMARK OFFICE
CERTIFICATE OF CORRECTION

| | | |
|---|---|---|
| PATENT NO. | : 6,438,547 C1 | Page 1 of 1 |
| APPLICATION NO. | : 90/010692 | |
| DATED | : August 9, 2011 | |
| INVENTOR(S) | : Mehr et al. | |

It is certified that error appears in the above-identified patent and that said Letters Patent is hereby corrected as shown below:

Column 2, line 17, change "entiry" to --entity--.

Signed and Sealed this
Twenty-fifth Day of October, 2011

David J. Kappos
*Director of the United States Patent and Trademark Office*

(12) EX PARTE REEXAMINATION CERTIFICATE (8455th)
United States Patent
Mehr et al.

(10) Number: US 6,438,547 C1
(45) Certificate Issued: *Aug. 9, 2011

(54) COMPUTER-READABLE DATA PRODUCT FOR MANAGING SALES INFORMATION

(75) Inventors: Dale Arthur Mehr, Mankato, MN (US); Jerome Dale Johnson, North Mankato, MN (US)

(73) Assignee: Manufacturing Systems Technologies, LLC, Dallas, TX (US)

Reexamination Request:
No. 90/010,692, Dec. 18, 2009

Reexamination Certificate for:
Patent No.: 6,438,547
Issued: Aug. 20, 2002
Appl. No.: 09/567,492
Filed: May 8, 2000

( * ) Notice: This patent is subject to a terminal disclaimer.

Related U.S. Application Data

(63) Continuation of application No. 08/926,870, filed on Sep. 10, 1997, now Pat. No. 6,141,658.

(51) Int. Cl.
*G06F 17/30* (2006.01)

(52) U.S. Cl. .................................................. 707/752
(58) Field of Classification Search .................. None
See application file for complete search history.

(56) References Cited

U.S. PATENT DOCUMENTS

| | | | | |
|---|---|---|---|---|
| 5,237,498 A | * | 8/1993 | Tenma et al. | |
| 5,260,866 A | * | 11/1993 | Lisinski et al. | |
| 5,283,865 A | * | 2/1994 | Johnson | |
| 5,367,627 A | * | 11/1994 | Johnson | |
| 5,493,490 A | * | 2/1996 | Johnson | |
| 5,515,524 A | * | 5/1996 | Lynch et al. | 703/13 |
| 5,615,342 A | * | 3/1997 | Johnson | |
| 5,625,776 A | * | 4/1997 | Johnson | |
| 5,708,798 A | * | 1/1998 | Lynch et al. | |
| 5,745,765 A | * | 4/1998 | Paseman | 717/107 |
| 5,758,331 A | * | 5/1998 | Johnson | |
| 5,765,143 A | * | 6/1998 | Sheldon et al. | |
| 5,822,735 A | * | 10/1998 | De Lapa et al. | |
| 5,825,651 A | * | 10/1998 | Gupta et al. | 700/103 |
| 6,067,525 A | * | 5/2000 | Johnson et al. | |

* cited by examiner

*Primary Examiner* — Eric B Kiss

(57) ABSTRACT

A computer system and method are used for managing product knowledge related to products offered for sale by a selling entity. The computer system includes a memory arrangement. At least one processing unit is coupled to the memory arrangement. A data model is defined that describes relationships between data categories. A data instance is input that corresponds to one or more of the data categories. The data instance represents at least part of the product knowledge. The computer system can also create a user-defined relationship item for the data instance and present the product knowledge to a user of the system in a manner established by the data model and the user-defined relationship. The product knowledge that is presented includes information that corresponds to the data instance.

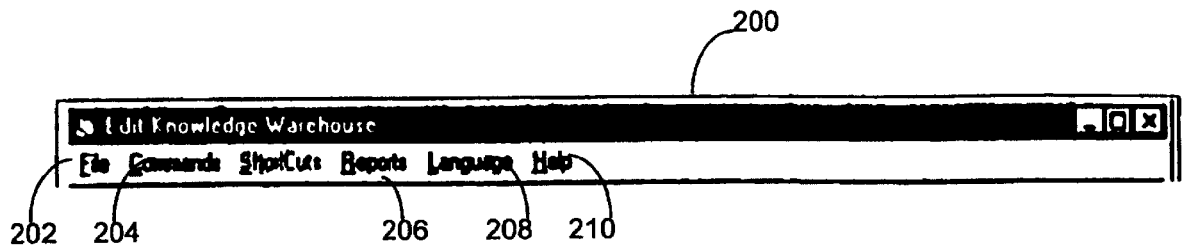

US 6,438,547 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3-5, 7, 8, 11, and 12 are cancelled.

New claims 18-23 are added and determined to be patentable.

Claims 2, 6, 9, 10, and 13-17 were not reexamined.

18. *A computer program product readable by a computing system and encoding a set of computer instructions implementing a method for managing product knowledge comprising a plurality of data items related to products offered for sale by a selling entity, the computing system including a memory arrangement and at least one processing unit, the method comprising:*

*defining a data model of data categories, the data model establishing category relationships between data categories;*

*receiving in the computer system one or more particular data items corresponding to one or more of the data categories;*

*receiving user-defined item relationship information for a received particular data item, the user-defined item relationship information relating the received particular data item to one or more other received particular data items; and*

*presenting the product knowledge, including the user-defined item relationship information about the received particular data item, to a user of the computing system in a manner established by the data model and the user-defined item relationship information;*

*wherein the data model is constructed from one or more data instance items interconnected using the user-defined item relationship information for each data instance item, and*

*displaying a graphical user interface having an edit menu bar,*

*wherein the edit menu bar includes:*

*a) a File active screen region;*

*b) a Commands active screen region configured to:*

*display, upon selection of the data model, a hierarchy of instances of data objects in the data model using a cascading popup menu; and*

*remove, upon receiving a removal command from the user with sufficient access rights, locks left in a database by abnormal exiting;*

*c) a Shortcuts active screen region;*

*d) a Reports active screen region configured to:*

*first generate, upon selection of a first format, a first format report listing: names of each data object in the database, a parent object corresponding to each object in the database, and a number of attributes of each object in the database;*

*second generate, upon selection of a second format, a second format report listing: reported lists of all attributes of each object in the database, and properties of each object in the database; and*

*third generate, upon selection of a third format, a third format report listing contents of every instance of every object in the database;*

*e) a Language active screen region configured to allow the user to select a language for interfacing with the database.*

19. *A computer program product readable by a computing system and encoding a set of computer instructions implementing a method for managing product knowledge comprising a plurality of data items related to products offered for sale by a selling entity, the computing system including a memory arrangement and at least one processing unit, the method comprising:*

*defining a data model of data categories, the data model establishing category relationships between data categories;*

*receiving in the computer system one or more particular data items corresponding to one or more of the data categories;*

*receiving user-defined item relationship information for a received particular data item, the user-defined item relationship information relating the received particular data item to one or more other received particular data items; and*

*presenting the product knowledge, including the user-defined item relationship information about the received particular data item, to a user of the computing system in a manner established by the data model and the user-defined item relationship information;*

*wherein the data model is constructed from one or more data instance items interconnected using the user-defined item relationship information for each data instance item, and*

*displaying a children graphical user interface including the following features:*

*a) a selector for selecting a structure for viewing children of a selected object;*

*b) a tree-like structure display including:*

*a collapse button for the selected object,*

*a name of the selected object, and*

*an expansion button for each of the children listed under the name of the selected object;*

*c) a navigational grid, activated by highlighting an object in the tree-like structure display to select the highlighted object for in-depth viewing, the navigational grid being populated with children objects or instances of the selected object, wherein the navigational grid includes:*

*an indicator column for the children of the selected object;*

*a description type column for descriptions of the children of the selected object; and*

*an instance type item column; and*

*d) a secondary function popup menu configured to provide access to:*

*a deleting objects operation;*

*a sorting objects operation; and*

*a filtering objects operation.*

20. *A computer program product, according to claim 19, wherein the secondary function popup menu is further configured to invoke a dialog box, the dialog box including:* a text entry field for entering the name of a new instance;

an instance type list box for selecting a type of the new instance; and an actuate button to add the new instance and exit the dialog box.

21. A computer program product, according to claim 19, wherein the secondary function popup menu is further configured to invoke a dialog box for attaching an existing instance to a selected instance, the dialog box including:

an instance type list box; and an available instances list box having:
- a select object to attach to a selected instance button;
- a name column; and
- a description column.

22. A computer program product, according to claim 19, wherein the secondary function popup menu is further configured to invoke a dialog box for duplicating instances, the dialog box including:

a expansion button associated with an illustrated object;

a collapse button associated with the illustrated object;

duplication icons for duplicating the selected object, the duplication icons including:
- a copy all attributes icon configured to duplicate the selected object including all attributes of the selected object, and excluding all links of the selected object;
- a copy all links icon configured to duplicate the selected object including all links of the selected object, and excluding all attributes of the selected object;
- a copy all links and attributes icon configured to duplicate the selected object including all links of the selected object, and including all attributes of the selected object; and
- an instance only icon configured to duplicate only the selected object, excluding all links of the selected object, and excluding all attributes of the selected object; and an identical instance icon configured to create an instance that is identical to the selected object.

23. A computer program product, according to claim 19, wherein the secondary function popup menu is further configured to invoke a dialog box for attaching an instance to a predefined group, the dialog box comprising:

an instance type box configured to select a type of the instance to be attached;

an available group list box configured to, upon selection of the type of instance to be attached, list available groups to which the type of instance may be attached, the available group list box including:
- a name column;
- a description column;
- an instance column; and
- a check box column configured to select a group to which the selected type of instance is to be attached; and an actuation button configured to attach the selected type of instance to the selected group.

* * * * *